United States Patent

[11] 3,597,987

| [72] | Inventor | Elmer Carl Kiekhaefer<br>2408 Cypress Gardens Road, Winter Haven, Fla. 33880 |
|---|---|---|
| [21] | Appl. No. | 819,178 |
| [22] | Filed | Apr. 25, 1969 |
| [45] | Patented | Aug. 10, 1971 |

[54] VARIABLE SPEED SHEAVE
5 Claims, 5 Drawing Figs.

[52] U.S. Cl. .................................................. 74/230.17 E
[51] Int. Cl. ...................................................... F16h 55/52
[50] Field of Search ........................................... 74/230.17

[56] References Cited
UNITED STATES PATENTS
3,393,572  7/1968  Larsson ........................ 74/230.17

FOREIGN PATENTS
724,395  12/1965  Canada ........................ 74/230.17
1,338,265  8/1963  France ........................ 74/230.17

Primary Examiner—Milton Kaufman
Attorney—Andrus, Sceales, Starke and Sawall

ABSTRACT: A variable speed sheave employing centrifugal flyweights actuating an axially movable sheave half, utilizes a replaceable washer to take the thrust of the weights, and offsetting or skewing the flyweights to avoid fixed wear tracks under the cams of the flyweights engaging the washer. A diecast replaceable bushing is employed to support the flyweight pintals and thereby avoid expensive machining of the bearing parts. Six circumferentially spaced positions are provided for flyweights whereby either two, three, four or six flyweights may be employed without disturbing the dynamic balance of the sheave.

Patented Aug. 10, 1971  3,597,987
2 Sheets-Sheet 1
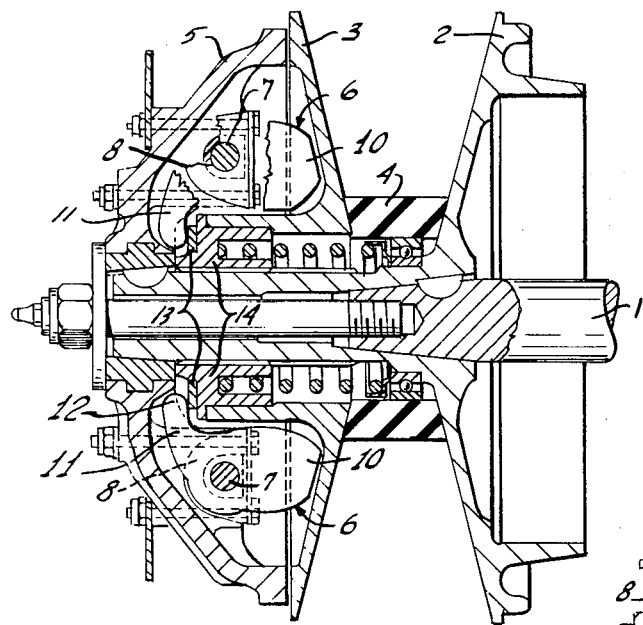
FIG_1
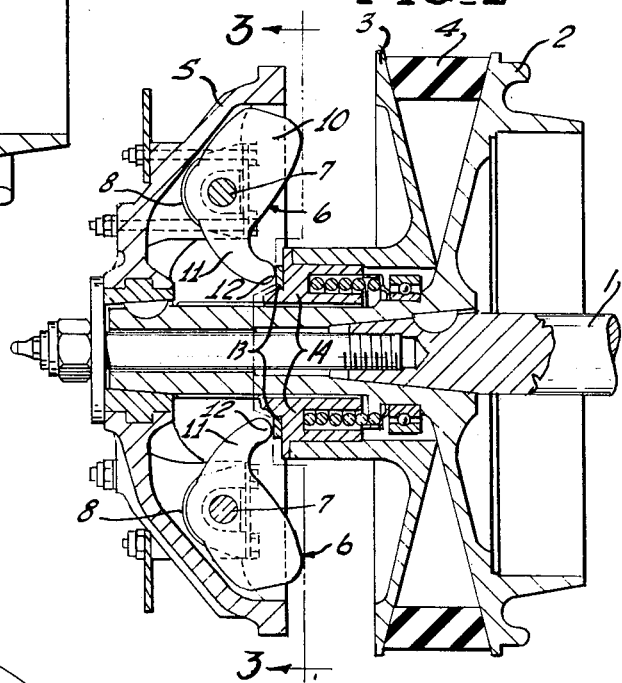
FIG_2
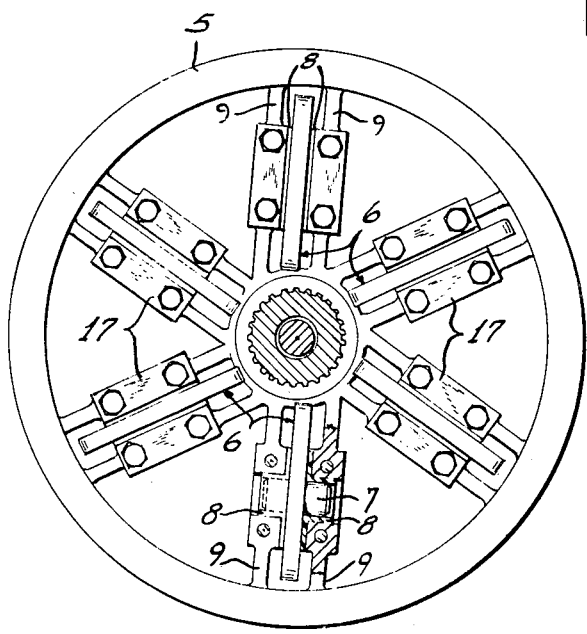
FIG_3
INVENTOR.
ELMER CARL KIEKHAEFER
BY
Andrus, Sceales, Starke & Sawall
Attorneys Patented Aug. 10, 1971
3,597,987
2 Sheets-Sheet 2
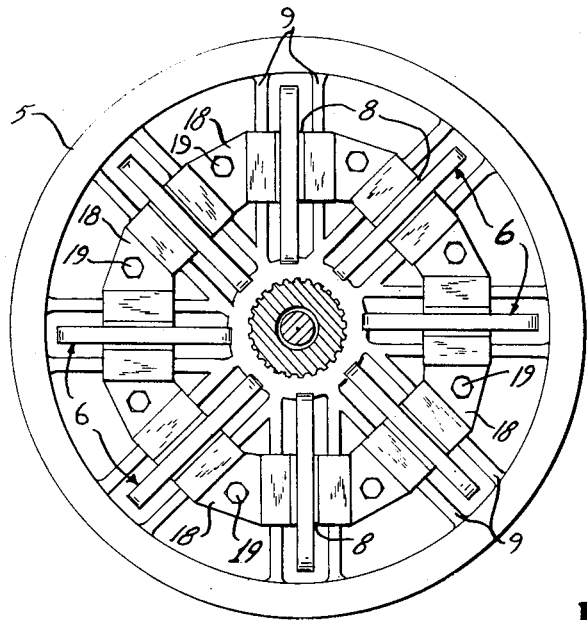
FIG_4
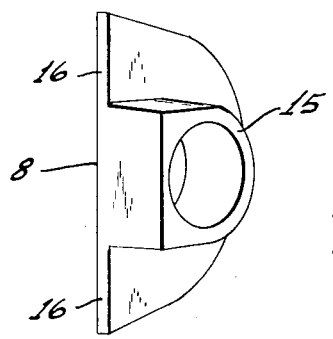
FIG_5
INVENTOR.
ELMER CARL KIEKHAEFER
BY
Andrus, Sceales, Starke & Sawall
Attorneys

VARIABLE SPEED SHEAVE

This invention relates to a variable speed V-belt sheave in which one-half of the sheave is axially adjustable relative to the other half and centrifugal flyweights are employed to govern the axial position of the movable sheave half.

In the construction of such sheaves heretofore it has been found that the cam members of the flyweights tend to wear a corresponding groove in the face of the surface with which they engage. In carrying out the present invention a floating replaceable washer is employed between the cam members and the face surface so that the wear is taken by a relatively inexpensive washer that can be readily replaced instead of occurring in a more expensive casting that might otherwise be difficult and expansive to replace.

Further, the invention proposes either offsetting or skewing the centrifugal weights so that the floating washer tends to rotate under the pressure of the cams as the weights move outwardly, and the washer tends to remain in its newly attained oriented position as the weights return inwardly. Repeated movement of the weights thereby reposition the washer so that each successive cam track is on a different surface of the washer.

Constructions heretofore have also necessitated rather expensive machining of the bearing surfaces and provided no means of readily compensating for wear. According to another feature of the present invention a simple bushing is employed to fit in an opening in the main casting and to support a corresponding flyweight. The casting need not be machined. The bushing is readily replaceable upon wear.

Most variable sheave constructions heretofore have been designed for employment of a specified fixed number of flyweights. It is desirable for manufacturing economy to construct a variable speed sheave that may be employed under different power conditions.

In order to enable a single construction of a variable sheave to be employed under different power conditions the present invention proposes to provide therein circumferentially spaced positions for six flyweights. Then it is possible to employ either two, three, for or six four depending upon the specific needs and without encountering any substantial loss of dynamic balance upon rotation.

All of the features are directed toward economy of manufacture and ready maintenance of the construction. In addition the several features provide certain operative advantages as explained above.

The accompanying drawings illustrate the best mode presently contemplated for carrying out the invention.

In the Drawings:

FIG. 1 is a schematic axial sectional view of the sheave with the halves separated as in idle nonrotating position;

FIG. 2 is a view similar to FIG. 1 with the unit rotating at high speed and showing the halves closed together under the centrifugal action of the flyweights;

FIG. 3 is a transverse section taken on line 3–3 of FIG. 2;

FIG. 4 is a view similar to FIG. 3 showing a construction with the flyweights laterally offset from the radial position as distinguished from the skew position shown in FIG. 2; and FIG. 5 is a enlarged perspective view of a bushing for mounting the flyweights.

The construction illustrated in the drawings comprises in general a rotary drive shaft 1 carrying a sheave made up of two halves 2 and 3 between which a belt 4 operates.

Sheave half 2 is axially fixed upon shaft 1 and rotates therewith.

Sheave half 3 is mounted for limited axial movement upon shaft 1 and is splined thereto to rotate therewith.

The shaft 1 also carries a flyweight housing 5 which faces the movable sheave half 3 on the side opposite from the fixed sheave half 2.

The housing 5 carries a plurality of circumferentially spaced flyweights 6 having corresponding trunnions 7 oscillatable in bearing bushings 8 received in openings in suitable webs 9 of the housing.

Each flyweight 6 one provided with a predetermined mass 10 or weight on one side of the trunnion 7 and an arm 11 with an end portion 12 on the side of the trunnion 7.

The end portions 12 of the flyweights 6 engage a floating washer 13 carried at the end of the hub 14 of sheave half 3, whereby the outward centrifugal movement of the several masses 10 upon rotation of the sheave causes the ends 12 to push washer 13 and thereby the hub 14 and sheave half 3 axially toward the fixed sheave half 2.

The washer 13 is readily replaceable upon wear, thereby avoiding the necessity of replacing the entire movable sheave 3.

In order to avoid wearing of a single track in washer 13 by each of the ends 12, the mounting for each of the flyweights 6 is either disposed at a skew to the radius as shown in FIG. 3 or disposed at a laterally offset position from the radius as shown in FIG. 4.

The effect of this skewing or offsetting of the flyweights 6 is to cause the point of contact or engagement between each end portion 12 and the washer 13 to follow a spiral path as the corresponding mass 10 moves outwardly under centrifugal force, thus tending to rotate the washer somewhat with each such successive outward movement of the flyweight mass 10 upon increase in rotational speed of the sheave.

When the rotational speed of the sheave is reduced the mass 10 of each flyweight 6 moves inwardly and tends to relieve the pressure of contact or engagement between end 12 and washer 13, thus failing to cause the washer 13 to rotate in a reverse direction upon speed reduction. The effect of this is to permit the washer 13 to retain its orientation during periods of speed reduction and to be rotationally oriented to new positions during periods of speed increase.

Only by the employment of a rotationally floating washer 13 is it possible to provide the above described advantage from skewing or offsetting the flyweights 6.

The bushing 8 for each flyweight is constructed in the form illustrated in FIG. 5 and comprises a cup-shaped body 15 with a flange 16 at the rim and extending nearly for the circumference thereof. Bushing 8 may be a die casting or it may be constructed of a suitable plastic.

Each web 9 has a recess in its free edge for receiving the cup 15 of a bushing 8, and a cap plate 17 is bolted of riveted to the web over the recess to removably secure the bushing in place.

The trunnion 7 of each flyweight 6 fits in the cup 15 of bushing 8 and is adapted for limited oscillation therein as the mass weights 10 respond to centrifugal action.

In the construction illustrated there are six pair of webs 9 equally spaced circumferentially of the housing 5. The advantage of this construction for the die cast housing 5 lies in utilizing the same housing for units designed for different actions whereby selectively either two, three, four or six flyweights 6 may be employed and at the same time provide a dynamic balance for the sheave.

As shown in FIG. 4, instead of employing the individual cap plates 17 of FIG. 3 to secure the bushings 8 in place, a larger cap plate 18 is applied over the bushings in two angularly adjacent webs and a single bolt 19 secures the plate 18 in place.

I claim:

1. A variable speed drive sheave employing centrifugal flyweights actuating an axially movable sheave half toward and away from a fixed sheave half on a rotary drive shaft and in which said axially movable sheave half is interlocked to rotate with said fixed sheave half and each flyweight has an end portion bearing against a free floating wear washer disposed between the flyweights and the abutting portion of the hub of the axially movable sheave, and each flyweight is disposed nonradially relative to the corresponding radius of the sheave to effect an increment of rotation of the washer each time the sheave is increased in speed.

2. The construction of claim 1 in which each flyweight is skewed with respect to the corresponding radius of the sheave.

3. The construction of claim 1 in which each flyweight is laterally offset from the corresponding radius of the sheave.

4. A variable speed drive sheave employing centrifugal flyweights actuating an axially movable sheave half toward and away from a fixed sheave half on a rotary drive shaft and in which said axially movable sheave half is interlocked to rotate with said fixed sheave half and each flyweight has an end portion bearing against a free floating wear washer disposed between the flyweights and the abutting portion of the hub of the axially movable sheave, and each flyweight is provided with axially aligned trunnions on opposite sides thereof, a flyweight housing is carried by the drive shaft for the sheave ad has a pair of webs for supporting each flyweight, and separate bushing for each flyweight trunnion is removably mounted in a corresponding web.

5. The construction of claim 4 in which the housing has six pairs of webs equally spaced circumferentially thereof to provide for selective employment of two, three, four or six flyweights for the sheave with the flyweights disposed in a dynamic balanced relation.